Patented Aug. 17, 1954

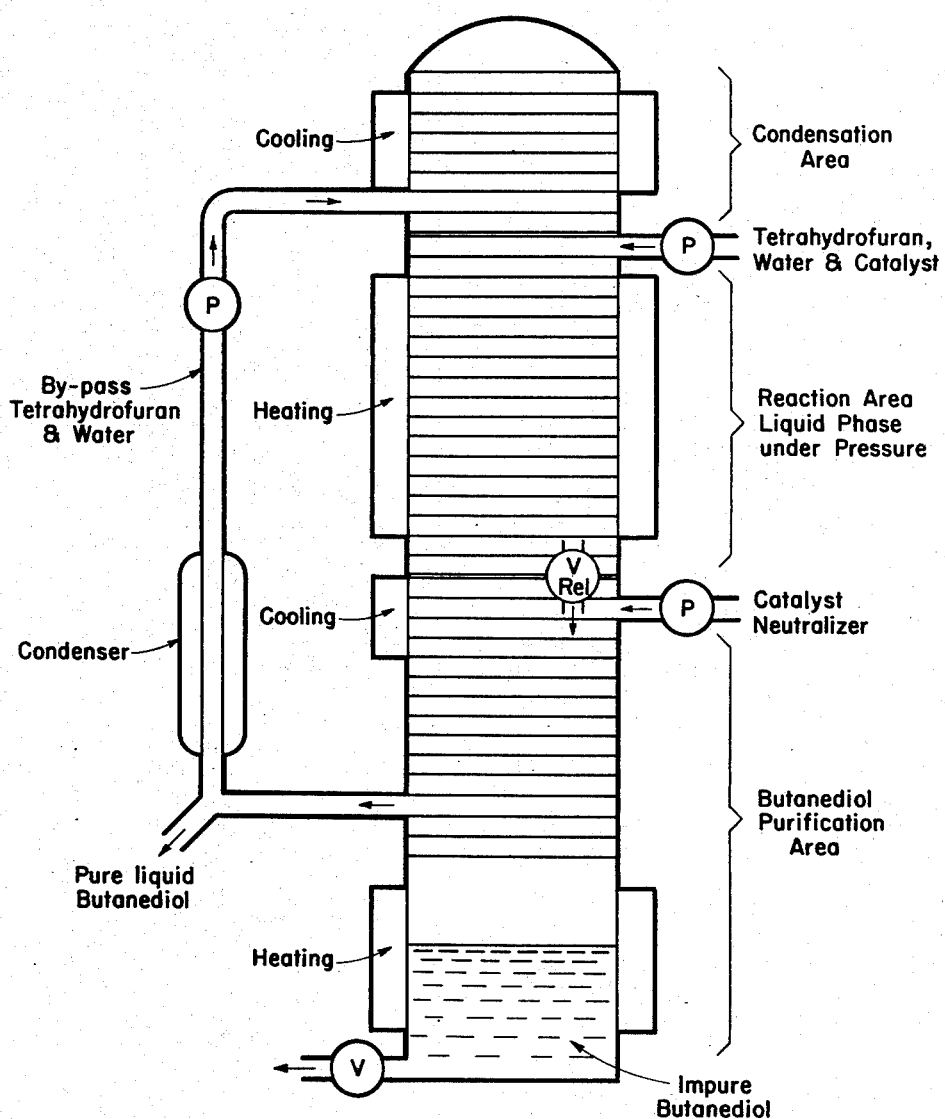

2,686,817

UNITED STATES PATENT OFFICE 2,686,817

PRODUCTION OF 1,4-BUTANEDIOL FROM TETRAHYDROFURAN

Joseph P. Copes, Easton, Pa., and Clyde McKinley, Belvidere, N. J., assignors to General Aniline & Film Corporation, New York, N. Y., a corporation of Delaware Application January 2, 1951, Serial No. 203,982

2 Claims. (Cl. 260—635)

This invention relates to a new process for the preparation of 1,4-butanediol.

1,4-butanediol has previously been prepared by a reaction between acetylene and formaldehyde followed by a reduction using hydrogen.

The present invention relates more particularly to the production of 1,4-butanediol from tetrahydrofuran and water. It has been found that, in the presence of suitable catalysts, tetrahydrofuran, water and 1,4-butanediol exist in an equilibrium in which there is a very small amount of 1,4-butanediol, as for example in some cases as much as 6% 1,4-butanediol.

It is therefore an object of the present invention to provide a process for the preparation of 1,4-butanediol from tetrahydrofuran and water.

These and other objects of the present invention are attained by the process of this invention which comprises reacting tetrahydrofuran with water at an elevated temperature, in the presence of a suitable catalyst such as the stronger mineral acids, and the withdrawal from the reaction mixture of the 1,4-butanediol. We have devised a process capable of overcoming the unfavorable ratio at equilibrium conditions.

A preferred embodiment of the invention is illustrated in the drawing, but it will be understood that substitutions and variations within the scope of the claims may be made without departing from the invention.

Catalysts suitable for the reaction comprise the stronger mineral acids such as hydrochloric acid, phosphoric acid, sulfuric acid. A preferred catalyst for use in the process as illustrated in the drawing is HCl. The advantages of a volatile catalyst will be apparent in the following description.

In the drawing tetrahydrofuran, water and preferably a volatile catalyst such as HCl are admitted under pressure near the top of a bubble plate tower which is represented diagrammatically. The area into which the reaction mixture falls is heated, preferably to a temperature within the range 200 to 300° C. and maintained under a pressure of 500 to 1500 pounds per square inch, the pressure being principally due to partial pressure of the constituents of the reaction mixture and/or other components. As the liquid falls downwardly by gravity the hydrolytic reaction takes place, and equilibrium established among tetrahydrofuran, water and 1,4-butanediol. As the mixture approaches the bottom of this section of the reactor, the volatile catalyst would largely be removed by a process of evaporation, and would tend to rise to the upper regions of the reaction chamber for further use (recycle). By appropriate procedure the tetrahydrofuran and water as their azeotrope distill up the column to regions of stronger catalyst concentration to recycle down the reaction column by gravity. The material passes through a pressure relief valve and continues downwardly under reduced pressure and at a lower temperature. It is essential that no catalyst be present in the mixture after it has passed the relief valve. It may be expected that a catalyst such as HCl will be completely volatilized in the properly constructed and properly operating apparatus. When a non-volatile catalyst is employed, it is necessary to introduce a catalyst neutralizing agent, for example sodium carbonate, at a point near the pressure relief valve. In this case the neutralization products would be withdrawn from the bottom of the purification section of the reactor as shown in the drawing. Material reaching the lower end of the column may be again heated to volatilize the tetrahydrofuran-water azeotrope. Part way up the column liquid and vaporous 1,4-butanediol and vaporous tetrahydrofuran-water azeotrope are allowed to escape from the column. These pass through a condenser adapted by physical design and selection of temperature to condense out the higher boiling 1,4-butanediol and allow the more volatile tetrahydrofuran-water azeotrope to pass upwardly to a point of entry near the entry point for the original reactants. The top of the column is cooled to return the volatilized reactants to the liquid state.

Thus it can be seen that the process is continuous, with reactants and make up catalysts added continuously at the top, 1,4-butanediol being continuously withdrawn at the bottom and/or at the side of the reactor, and catalyst neutralizing agents continuously being added at the top of the butanediol purification section, catalyst neutralizing products, if any, being continuously withdrawn at the bottom. Further unreacted reactants are continually distilling away from the forming equilibrium mixture in the reactor and condensing at the cooler top, as is also the volatile catalyst. Unreacted feedstocks are continually completely removed from the desired product in the purification section and continually added at the reaction zone.

The separations are made possible by the various boiling points of the materials. The 1,4-butanediol has a boiling point which is variously represented as from 203 to 211° C., tetrahydrofuran has a boiling point of about 65° C. and the azeotropic mixture (6% water and 94% tetrahydrofuran) has a boiling point of about 63.4° C. The 1,4-butanediol does not form an azeotrope with water.

While the drawing illustrates a continuous process the reaction may be carried out batchwise, as for example in the following manner: A commercial tetrahydrofuran was analyzed for 1,4-butanediol and was found to contain none. The tetrahydrofuran was heated with water containing phosphoric acid in quantities such that the pH of the reaction mixture equaled 2. The mixture was heated for about two hours at about 270° C. upon which about 1300 pounds per square inch autogenous pressure developed. The product was then chilled, and sodium carbonate was added until the pH reached 7. The unreacted tetrahydrofuran and water were removed by distillation. The residue was extracted with acetone and the extract partially evaporated to remove acetone. The resulting product containing crude 1,4-butanediol was distilled, and 1,4-butanediol was recovered as a distillation product.

The amount of catalyst used in the reaction mixture is preferably that which yields a pH of the reaction mixture in the range 1.5 to 3.0. The temperature of the reaction should be in the range 100 to 400° C. and the pressure sufficient to prevent volatilization at the temperature used, which would usually be between 500 and 1500 pounds per square inch. The temperature in the still pot should be just above the boiling point of the tetrahydrofuran-water azeotrope at the prevailing pressure.

We claim:

1. A continuous process for producing 1,4-butanediol which comprises continuously reacting tetrahydrofuran and water in the presence of an acid catalyst at a temperature in the range 200 to 300° C., continuously passing the reacted mixture to a zone of lower temperature and pressure, heating in this zone to drive off the tetrahydrofuran-water azeotrope and pure 1,4-butanediol, and condensing this mixture to obtain pure liquid 1,4-butanediol and an overhead of tetrahydrofuran and water.

2. A continuous process for producing 1,4-butanediol which comprises continuously reacting tetrahydrofuran and water in the presence of an acid catalyst at a temperature in the range 200 to 300° C., continuously passing the reacted mixture to a zone of lower temperature and pressure, heating in this zone to drive off the tetrahydrofuran-water azeotrope and pure 1,4-butanediol, condensing this mixture to obtain pure liquid 1,4-butanediol and an overhead of tetrahydrofuran and water, and subsequently condensing the tetrahydrofuran-water azeotrope and continuously recycling it to the reaction zone.

References Cited in the file of this patent

UNITED STATES PATENTS

| Number | Name | Date |
| --- | --- | --- |
| 2,082,025 | Peters | June 1, 1937 |
| 2,097,493 | Leuck et al. | Nov. 2, 1937 |
| 2,255,411 | Cohen et al. | Sept. 9, 1941 |

OTHER REFERENCES

Hackh, "Chemical Dictionary," 3rd ed., 1944, p. 151, published by the Blackiston Co., Philadelphia.

Journal Industrial and Engineering Chemistry, vol. 40, No. 2 (Feb. 1948), pp. 216–217 (article by Oliver W. Cass).

Jour. Industrial and Engineering Chemistry, vol. 40, No. 2 (Feb. 1948), page 218 (article by Cass).

Elderfield, "Heterocyclic Compounds," vol. 1, page 175. Published by John Wiley and Sons, Inc., New York, 1950.